United States Patent Office 2,713,566
Patented July 19, 1955

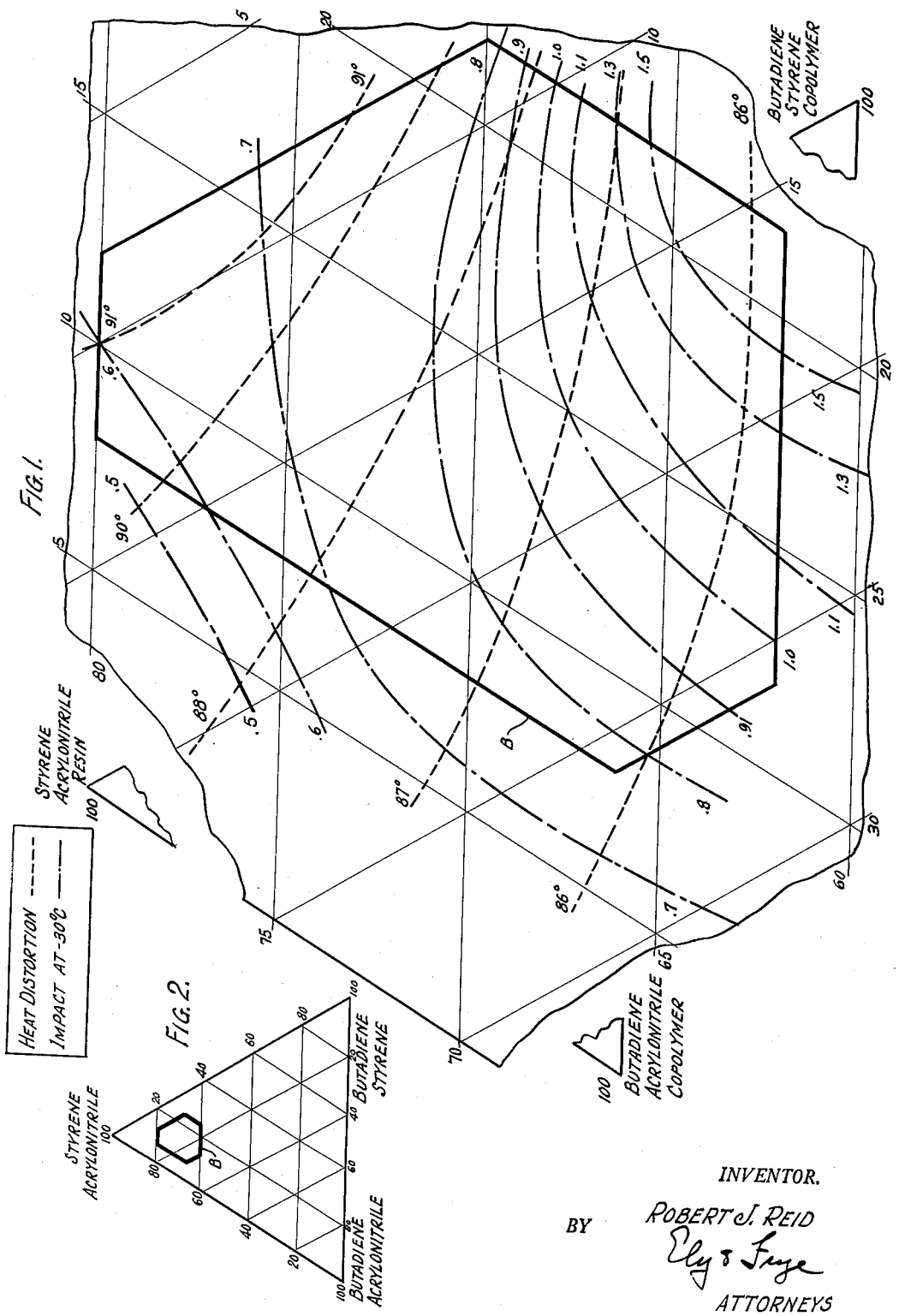

2,713,566

TERNARY POLYMER COMPOSITION

Robert J. Reid, Canal Fulton, Ohio, assignor to The Firestone Tire & Rubber Company, Akron, Ohio, a corporation of Ohio Application February 21, 1951, Serial No. 212,164

18 Claims. (Cl. 260—45.5)

This invention relates to novel three-component compositions having outstanding combinations of properties, particularly hardness, low temperature impact strength and resistance to distortion by heat.

A number of combinations of various high polymeric substances have heretofore been proposed as having desirable properties above and beyond those of the individual constituent polymeric substances. One such combination comprises a blend of (A) a butadiene-acrylonitrile elastomeric copolymer with (B) a styreneacrylonitrile copolymer. However, these compositions have been found to be deficient in certain combinations of properties, notably hardness, impact strength (particularly impact strength at low temperature) and heat distortion temperature; if such compositions are compounded so as to enhance one of these properties, others of the properties suffer, and vice versa.

Accordingly, it is an object of this invention to provide novel multicomponent resinous compositions having superior combinations of properties.

Another object is to make use of the butadiene-acrylonitrile elastomeric copolymers and styrene-acrylonitrile copolymers to produce compositions of superior properties.

A further object is to provide such compositions which will be characterized by simultaneous and concurrent excellence in a plurality of their properties, notably low temperature impact strength, hardness, modulus of elasticity and resistance to heat distortion.

A still further object is to provide such compositions which involve the use only of inexpensive and readily available materials.

The invention will be described in connection with the accompanying drawing in which:

Fig. 1 is a portion of a trilinear chart, on a large scale, showing the variation in properties of the compositions of this invention with the proportions of the components used, and Fig. 2 is the entire small scale trilinear chart of which Fig. 1 is a part, of the ternary compositions of this invention.

SYNOPSIS OF THE INVENTION

It has been discovered by this invention that, particularly within a certain range of compositions, the replacement, with butadiene polymers or butadiene-styrene copolymers, of a portion of the butadiene-acrylonitrile copolymers in compositions of these materials with styrene-acrylonitrile copolymers, results in a simultaneous enhancement of the modulus of elasticity, hardness, low temperature impact strength and heat resistance of these compositions. The resultant preferred hard, rigid polymeric compositions in accordance with this invention fall within the following special ranges:

|  | Per cent |
|---|---|
| Styrene-acrylonitrile copolymer | 62–80 |
| Butadiene-acrylonitrile elastomeric copolymer | 8–26 |
| Butadiene elastomeric polymer or butadiene-styrene elastomeric copolymer | 8–22 |

The aforesaid percentages are based on the combined total weight of said copolymers in the composition. In turn, the combined total weight of the copolymers constitutes at least 85% by weight of the toal composition, any balance being made up of miscellaneous compounding agents such as pigments, vulcanizing agents, stabilizers, plasticizers, etc. The desirable properties of the compounds of this invention are all the more remarkable when it is considered that elevated heat distortion temperature and increased impact strength are largely conflicting properties, and factors tending to enhance the one will usually depress the other. Likewise, butadiene polymers and butadiene-styrene copolymers are incompatible with styrene-acrylonitrile copolymers individually, and the formation of a successful ternary composition from these components would not be expected.

THE STYRENE-ACRYLONITRILE RESINOUS COPOLYMERS

Styrene and acrylonitrile are known to copolymerize under free-radical catalysis in various ratios to yield resinous materials. The "azeotropic" composition, i. e., the composition at which the styrene and acrylonitrile will enter the copolymer in the same ratio in which the monomers are present in the polymerization mass, is approximately 78% styrene, 22% acrylonitrile, and it will be preferred and most convenient to employ copolymers of this composition. However for the purpose of this invention the proportions may vary from 55 to 80% styrene, balance acrylonitrile. Other factors being constant, with an increase in the acrylonitrile content of the resinous copolymer, the hardness, modulus of elasticity, and impact strength of the resulting composition prepared according to this invention will likewise increase. In those cases where it is desired to prepare copolymers in which the styrene content departs greatly from the "azeotropic" value, say more than 5% in either direction, the polymer should be prepared by an incremental technique, in which the ratio of as-yet-unpolymerized styrene to as-yet-unpolymerized acrylonitrile in the polymerizing mass is maintained constant by periodic addition of the monomer which is in excess of the azeotropic proportion. When this technique is employed, the copolymer product will be "homogeneous" in that all polymer molecules have substantially the same composition. The concentration of the as-yet-unpolymerized monomers in any polymerization mass and the composition of the polymers formed are related by the equation:

(1) $$\frac{dM_1}{dM_2} = \frac{M_1}{M_2} \cdot \frac{M_1 r_1 + M_2}{M_2 r_2 + M_1}$$

under the notation of Lewis et al., J. A. C. S. 70:1519–23, wherein, as applied to the present instance, all quantities being on a molar basis:

$\frac{dM_1}{dM_2}$ = the ratio of styrene to acrylonitrile in the co polymer currently being formed at the time under consideration.

$M_1$ = the concentration of as-yet-unpolymerized styrene in the reaction mixture at the time under consideration.

$r_1 = 0.41$ = reactivity ratio for styrene.

$M_2$ = concentration of as-yet-unpolymerized acrylonitrile in the charge at the time under consideration.

$r_2 = .04$ = reactivity ratio for acrylonitrille.

In order to prepare a "homogeneous" copolymer, the ratio of styrene and acrylonitrile required in the monomer mixture in order to produce a copolymer of the desired composition is calculated from the Equation 1, and these monomers charged in the calculated ratio into the polymerization mixture. The polymerization is then started, the reaction mass analyzed from time to time, and additional styrene or acrylonitrile added to bring the ratio of as-yet-unpolymerized styrene to as-yet-unpolymerized acrylonitrile back to its original value. These copolymers may be produced by polymerizing the monomers in any conventional free radical systems, either solution, mass, emulsion or suspension. The polymerization mass may contain modifiers or "chain-transfer agents" such as lauryl mercaptan and other fatty mercaptans. Compositions according to this invention containing styrene-acrylonitrile copolymers prepared in the presence of these modifiers band readily on the roll mill; however, they do not "break down" during milling, and sheeted products made therefrom are apt to ruffle unless care is taken during any hot-post-forming operations conducted thereon. The products do, however, have better hot strength and better deep-drawing behavior than comparable materials made from styrene-acrylonitrile copolymers prepared in the absence of modifiers. In general, the modified copolymers will have a relative viscosity, in 1% solution in acetone at 25° C., of about 1.4–2.0. Compositions containing the unmodified copolymers, although they are difficult to band on the mill, do ultimately break down smoothly, and sheeted products made therefrom are less susceptible of ruffling during hot-post-forming.

THE BUTADIENE-ACRYLONITRILE ELASTOMERIC COPOLYMERS

These are well known commercial hydrocarbon-resistant synthetic rubbery materials which are copolymers of 55–85% butadiene, balance acrylonitrile based on the weight of the copolymers. In general, other variables being fixed, the greater the amount of acrylonitrile in a butadiene-acrylonitrile copolymer, the greater will be the hardness, modulus of elasticity and room temperature impact strength of compositions made therefrom in accordance with this invention. Low temperature properties are favored by lower acrylonitrile contents, however. The best all-around properties will be obtained with those copolymers containing about 75% butadiene, 25% acrylonitrile. Commercially, these synthetic rubbers are produced in a free radical catalysed emulsion polymerization system, usually in the presence of small amounts of chain-transfer agents such as are mentioned above in connection with the styrene-acrylonitrile copolymers. These agents are ordinarily used to some extent even when their modifying action is not required, in order to activate the catalysts in the system. Similarly to the styrene-acrylonitrile system, butadiene and acrylonitrile have a preferred "azeotropic" copolymerization proportion which is 63% butadiene, balance acrylonitrile. If it is desired to depart from this ratio, it may be advantageous to employ an increment technique such as described above in connection with the styrene-acrylonitrile copolymers. In the present case, the reactivity ratio $r_1$ for butadiene is 0.35 and the reactivity ratio $r_2$ for acrylonitrile is .04, determined in solution polymerization systems. These values will be slightly different in emulsion polymerization systems, but the values for solution systems will be accurate enough for practical purposes.

THE BUTADIENE POLYMERS AND BUTADIENE-STYRENE COPOLYMERS

These may be any elastomeric homopolymers of butadiene-1,3 or copolymers thereof with up to 35% of styrene and conversely containing at least 65% of butadiene, such as are commonly used as general purpose synthetic rubbers. These polymers and copolymers are commercially produced by substantially the same processes as are the butadiene-acrylonitrile copolymers described above, the butadiene, or mixture thereof with styrene, being substituted for the monomeric constituents in the case of butadiene-acrylonitrile copolymers. Increment monomer addition techniques may be practiced in the manufacture of copolymers of butadiene with styrene as described in connection with the other copolymers, the reactivity ratios for butadiene and styrene being respectively 1.5 and 0.2. The nature of the system is such that there is no preferred azeotropic composition.

COMPOUNDING OF THE COMPOSITIONS OF THIS INVENTION

The three polymeric components (styrene-acrylonitrile resin, butadiene-acrylonitrile copolymer and butadiene polymer or butadiene-styrene copolymer) employed in this invention may be blended by a variety of techniques and apparatus. Since all three components are commercially manufactured in the latex form, they may be blended by mixing together the latices and adding a coagulant to coprecipitate the materials as a homogeneous blend. Alternatively, the solid components may be blended together on a roll mill or in a Banbury mill. Even when the components are blended together by coprecipitation from the latex, it will often be desirable, particularly when the styrene-acrylonitrile copolymers are unmodified, i. e., prepared at low temperatures in the presence of only small amounts of chain transfer agents, or no chain-transfer agents whatever, to work the compositions on a suitable mill in order to break them down and render them more amenable to subsequent calendering or other fabricating operations. As noted above, the unmodified copolymers are much more responsive to such milling operations than the modified copolymers, and eventually break down into a smooth band to form a compound which will accept and retain the shape ultimately imposed thereon. The milling should preferably not be excessively prolonged, i. e., should not extend beyond 20 minutes to 40 minutes at conventional milling speeds and gaps, in order to avoid discoloration of the compound and degradation of properties.

It is to be understood that compositions according to this invention may contain miscellaneous additional compounding agents, such as pigments on the order of carbon black, zinc oxide, titanium dioxide, etc.; vulcanizing ingredients such as sulfur and accelerators; plasticizers such as dioctyl phthalate, dioctyl sebacate and the like; and light and/or heat stabilizing substances such as phenyl salicylate, lead stearate and the like. The composition as a whole will have the advantageous properties of the compositions of this invention, provided that the total weight of styrene-acrylonitrile, butadiene-acrylonitrile and butadiene-styrene copolymers constitutes at least 85% of the entire mixture, the balance of which is constituted of conventional stabilizers, plasticizers, pigments, reinforcing agents and the like.

THE PROPERTIES AND USES OF THE COMPOSITIONS OF THIS INVENTION

The difference in properties between the ternary compositions of this invention and compositions involving binary mixtures of the styrene-acrylonitrile copolymers with the butadiene-acrylonitrile copolymers will best be appreciated from a consideration of Fig. 1 which is a portion of a trilinear chart, whereof the vertices (all off the scale) are respectively at the top, the styrene-acrylonitrile copolymer; at the lower left, the butadiene-acrylonitrile copolymer; and at the lower right, the butadiene polymer or butadiene-styrene copolymer. The proportions within the scope of this invention are enclosed within the heavy solid boundary line B. Fig. 2 is a small scale representation of the entire chart of which Fig. 1 is a fragment.

On the chart of Fig. 1 are plotted iso-lines of the properties of ternary compositions involving the particular styrene-acrylonitrile copolymer, butadiene-acrylonitrile copolymer and butadiene-styrene copolymer employed in item 17 of the detailed Example I given hereinbelow. The dot-dash lines are those delineating all compositions having the −30° C. impact strengths indicated by the numbers adjoining these dot-dash lines; and the dotted lines are those delineating all compositions having the heat distortion temperatures indicated by the numbers adjoining these dotted lines. The actual values of these properties will vary somewhat with the particular copolymers employed; however, the qualitative trends will be the same for any set of three copolymers within the scope of those which may be employed in this invention. It will be seen that the range within the boundary line B is unique in that, in passing from the simple binary compositions along the (dotted) lines of equal heat distortion temperature, the (dot-dash) lines of equal-impact strength are intersected favorably (i. e., in the sense of increasing impact strength), or at least not abruptly in an unfavorable direction (i. e., in the sense of decreasing impact strength). This is a remarkable and highly useful result, since any factor increasing one of these properties usually diminishes the other.

While all of the compositions of this invention are characterized by the excellent properties and combinations of properties outlined above, certain specific compositions will have properties adapting them to certain particular applications. From this standpoint, there appear to be four general types of compositions falling within the ambit of this invention:

Type A, containing the styrene-acrylonitrile copolymer, butadiene-acrylonitrile copolymer and butadiene-styrene copolymer in the approximate weight ratios of 65/20/15 respectively. This composition has particularly outstanding low temperature properties; desirable in vehicle body interior panelling, etc.

Type B, containing the above copolymers in the respective approximate ratios of 80/10/10. Useful where special hardness is desired in addition to the other desirable properties, for instance in aircraft and trailer sinks, counter tops, etc.

Type C, containing the copolymers in the approximate ratios 75/15/10. A general purpose material suitable for display racks, advertising signs, etc.

Type D, containing the copolymers in the approximate ratios 70/17.5/12.5. A compromise between types A and C, sacrificing a slight amount of the extreme low temperature properties of type A for general strength and mar-resistance.

A feature of the compositions of this invention is their response to certain heat-treating procedures which will now be detailed. One of the principal applications of compositions according to this invention is in the formation of relatively heavy, semi-rigid sheetings destined for use as panels, either in the original flat shape or postformed into other shapes. The sheets are usually prepared by a hot calendering process, followed, if a glossy surface is desired, by a hot-press-polishing operation. In such operations, the sheets should be cooled relatively slowly through the range from the press-polishing temperature (usually in the range 120° C.–200° C.), down to below the heat distortion temperature (usually about 80° C.–95° C.) of the final product. This cooling should extend over not less than three or four minutes, based on measurement of temperatures in the stock. Sheets so treated will have considerably increased flex crack resistance, hardness and heat-distortion temperatures. It is not necessary that pressure be maintained upon the sheets during the cooling, beyond that necessary to prevent warpage; in fact, there are indications that it is better to limit the pressure, as by the use of spacers between the platens of the press so as to prevent the press from following up any deformation accepted by the sheets.

Even when the sheets are not press-polished, it is desirable to cool them slowly through the range from the calendering or other forming temperature down to below the softening temperature. For instance the sheetings may be taken from the calenders and stacked flat with metal caul-sheets so as to cool slowly while being held in shape. Likewise, in post-forming operations, the sheet should be cooled slowly, over a period of not less than three minutes, in the range from the post-forming temperature (usually on the order of 120° C. to 200° C.) down to below the heat-distortion temperature. The last cooling of a sheet (or other object fabricated or molded from compositions according to this invention) through the critical range from the forming temperature down below the heat distortion temperature, is controlling as to the flex-crack resistance, hardness and heat distortion temperature of the product, and any previous thermal history is without influence.

Compositions according to this invention may be used in a variety of applications, and are of particular advantage in relatively heavy semi-rigid sheetings approximately .1 to .30 inch thick adapted for use direct as flat panellings etc. or for post-forming into simple or compound curved panellings for automotive and other vehicle interiors; automotive wheel housings; formed luggage shells; sink and drainboard shells and other plumbing equipment, counters and enclosures; interior architectural trim; appliance standards, racks and the like; large display letters, signs and the like; sales racks; tote-boxes for use in manufacturing and order-assembly establishments; and cabinets for radio and television receivers. The compositions are readily calendered out at moderate temperatures into sheetings of the type above described, and withstand the necessary hot working without noticeable change in properties or appearance; the sheetings may be post-formed at relatively low temperatures, and accept relatively deep draws without undue localized attenuation. In the finished fabricated articles the materials have excellent dimensional stability and sufficiently high heat distortion points, usually 85–90° C. or better, so as to hold any shapes into which they may be fabricated. Their excellent impact strengths ensure their freedom from cracking or shattering under any stresses and shocks likely to be encountered in service. This excellent impact strength is retained even at low temperatures, which is important in the case of vehicle or aircraft panellings which may be exposed to winter temperatures. The compositions of this invention may also be employed for compression or injection molding of various objects.

With the foregoing general discussion in mind, there is given herewith a detailed example of the practice of this invention.

*Example I*

A series of compositions was made up from styreneacrylonitrile copolymers, butadiene-acrylonitrile copolymers and butadiene polymers or butadiene-styrene copolymers. In certain cases, the mixtures were blended by mixing the solid components on the roll mill at moderate temperatures, on the order of 340–355° F. (stock temperature); in other cases, latices of the several copolymers, in quantities calculated to contain the copolymers in the required proportions, were stirred together and coprecipitated by addition of calcium chloride. The coprecipitated mass was then washed to remove salts as far as was practical, dried, and then milled at 340°–355° F. (stock temperature). The particular method of mixing, whether by milling or latex blending, did not seem greatly to affect the properties of the resulting compositions.

The blended compositions were then pressed out in a flat platen heated press at 350° F. to form sheets oneeighth inch thick. The mechanical properties of these plaques were determined, and are tabulated herewith. No special precautions were taken to insure slow cooling in the presses, so that in many cases the optimum hardness and heat distortion temperatures were not attained.

TABLE I

| Components Used | | | | Mechanical Properties | | | | | | | | | | | Item No. |
|---|---|---|---|---|---|---|---|---|---|---|---|---|---|---|---|
| Styrene Acrylonitrile Copolymer Used A | Butadiene Acrylonitrile Copolymer Used B | Butadiene Styrene Copolymer Used C | Weight Ratio A/B/C | Izod Impact Strength In Foot-Pounds Per Square Inch At The Following Temperatures (° C.) | | | | | | | | Hardness (Rockwell R-scale) | Young's Modulus, lbs. per sq. inch at 25° C. | Heat Distortion temperature, ° C. | |
| | | | | 25 | 0 | −10 | −15 | −20 | −25 | −30 | −35 | | | | |
| 78% styrene, 22% acrylonitrile (Note 1). | 75% butadiene, 25% acrylonitrile (Note 2). | 75% butadiene, 25% styrene by weight (Note 3). | 65/0/35 | 0.7 | | | | | | | | 12 | 45,000 | 79 | 1 |
| | | | 65/35/0 | 6.4 | | | | 7.7 | 5.0 | 1.5 | 0.6 | 38 | 156,000 | 85 | 2 |
| | | | 65/15/20 | 5.2 | | | | 5.5 | 4.8 | 2.4 | 0.8 | 54 | 190,000 | 88 | 3 |
| | | | 75/15/10 | 6.9 | | | | 7.2 | 7.2 | 2.8 | 0.9 | 55 | 182,000 | 89 | 4 |
| | | | 70/17.5/12.5 | 4.3 | 4.1 | 2.5 | | 1.9 | | | | 69 | 247,000 | 92 | 5 |
| | | | | 7.5 | | | | | | 1.7 | | 65 | 215,000 | 88 | 5.1 |
| | | | 65/35/0 | 6.0 | 0.5 | | | | | | | 88 | | 86 | 6 |
| | | | 65/25/10 | 7.6 | 0.8 | | | | | | | 85 | | 87 | 7 |
| | | | 65/10/25 | 1.0 | 0.4 | | | | | | | 67 | | 88 | 8 |
| | | | 65/20/15 | 5.0 | | 1.0 | 0.3 | | | | | 83 | | 86 | 9 |
| | | | 65/35/0 | 7.5 | | | | 8.3 | | 1.8 | | 39 | 142,000 | 85 | 10 |
| Note 5 | Note 4 | Note 3 | 65/20/15 | 6.2 | 8.8 | | 6.8 | | 6.8 | | 3.5 | 50 | 175,000 | 92 | 11 |
| Note 6 | Note 2 | Note 3 | 65/20/15 | 7.7 | | 1.6 | | | | | | 81 | | 88 | 12 |
| | Note 4 | Note 7 | 65/20/15 | 5.0 | 5.6 | | 3.5 | 2.8 | 2.1 | 1.3 | | 50 | 148,000 | 91 | 13 |
| Note 5 | Note 2 | Note 3 | 65/20/15 | 4.2 | 3.6 | 1.9 | | 1.5 | 1.3 | | | 60 | 190,000 | 97 | 14 |
| Note 9 | Note 2 | Note 3 | 80/20/0 | 0.8 | | | | | | 0.2 | | 105 | 343,000 | 88 | 15 |
| | | | 80/10/10 | 1.5 | | | | | | 0.6 | | 105 | 307,000 | 91 | 16 |
| | | | 75/25/0 | 11.0 | | | | | | 0.4 | | 90 | 283,000 | 88 | 17 |
| | | | 75/15/10 | 6.3 | | | | | | 0.7 | | 95 | 289,000 | 88 | 18 |
| | | | 75/10/15 | 2.9 | | | | | | 0.7 | | 93 | 296,000 | 91 | 19 |
| | | | 70/30/0 | 11.5 | | | | | | 0.6 | | 75 | 237,000 | 86 | 20 |
| | | | 70/20/10 | 9.5 | | | | | | 0.8 | | 75 | 250,000 | 89 | 21 |
| | | | 70/10/20 | 4.1 | | | | | | 0.8 | | 74 | 263,000 | 88 | 22 |
| | | | 65/35/0 | 11.9 | | | | | | 0.5 | | 55 | 155,000 | 85 | 23 |
| Note 10 | Note 11 | Note 3 | 65/20/15 | 8.5 | | | | | | 1.1 | | 58 | 203,000 | 86 | 24 |
| | | | 65/15/20 | 9.6 | | | | | | 1.5 | | 59 | 219,000 | 86 | 25 |
| | | | 60/40/0 | 11.0 | | | | | | 0.5 | | 38 | 162,000 | 83 | 26 |
| | | | 60/30/10 | 9.5 | | | | | | 0.8 | | 39 | 165,000 | 86 | 27 |
| | | | 60/25/15 | 8.5 | | | | | | 1.1 | | 38 | 172,000 | 86 | 28 |
| | | | 60/15/25 | 5.3 | | | | | | 1.3 | | 34 | 165,000 | 82 | 29 |
| | | | 60/10/30 | 3.8 | | | | | | 0.8 | | 35 | 187,000 | 83 | 30 |
| Note 1 | Note 12 | polybutadiene Note 13 | 75/15/10 | 1.1 | | | | | | 0.5 | | 103 | 336,000 | | 31 |
| | Note 13 | | 75/15/10 | 2.8 | | | | | | 0.2 | | 107 | 317,000 | | 32 |
| | Note 2 | Note 13 | 75/15/10 | 5.9 | | | | | | 1.0 | | 88 | 267,000 | | 33 |

Note 1.—A copolymer containing 78% styrene, 22% acrylonitrile by weight. Polymerized in aqueous emulsion with sodium stearate at 85° F.
Note 2.—A copolymer containing 75% butadiene, 25% acrylonitrile by weight. Prepared in aqueous emulsion with sodium stearate at 122° F., in the presence of about 1% dodecyl mercaptan as a modifier. The Mooney plasticity is 17.
Note 3.—A standard GR-S copolymer of 71% butadiene, 29% styrene copolymerized in aqueous emulsion stabilized with sodium stearate, at 122° F., in the presence of about 1% dodecyl mercaptan as a modifier.
Note 4.—A copolymer containing 67% butadiene, balance acrylonitrile by weight. Prepared in aqueous emulsion with sodium stearate at 85° F. in the presence of about 1% dodecyl mercaptan as a modifier.
Note 5.—A copolymer of 78% styrene, 22% acrylonitrile by weight. Polymerized in aqueous emulsion with sodium stearate at 90° F., in the presence of 0.2% of a t-dodecyl mercaptan, based on the weight of monomers.
Note 6.—Copolymer containing 78% styrene, 22% acrylonitrile by weight. Polymerized in aqueous emulsion with sodium stearate at the presence of 0.2% of dodecyl mercaptan, based on the weight of monomers.
Note 7.—Same as the copolymer of note 3, except that 0.8% of a t-dodecyl mercaptan based on the weight of monomers was used in place of the dodecyl mercaptan.
Note 9.—A copolymer containing 62% styrene, 38% acrylonitrile prepared in aqueous emulsion with sodium stearate. The styrene was charged incrementwise during the polymerization in order to provide a homogeneous polymer product. Polymerization was at 85° F.
Note 10.—A copolymer of 78% styrene, 22% acrylonitrile prepared in aqueous emulsion at 90° F. stabilized by sodium stearate and catalyzed by potassium persulfate.
Note 11.—A copolymer of 69% butadiene, 31% acrylonitrile.
Note 12.—A copolymer of 63% butadiene, 37% acrylonitrile.
Note 13.—A copolymer of 90% butadiene, 10% styrene.

Compositions according to items Nos. 3, 4, 7, 12 and 13 were calendered out at 320° F. into sheets 3/16 inch thick, which sheets were then press-polished in a flat platen press at 350° F. The resultant sheets were then postformed into the shape of an automotive front door panel with an integral arm rest (Chevrolet 1950) by heating the sheet to 320° F. pressing out in mating wooden dies, and cooling in the dies. The draw at the arm rest involved an increase in area of about 600%, but no trouble was encountered from undue local attenuation. The fabricated products had excellent dimensional accuracy and stability, and were found highly satisfactory in service.

*Example II.—Compositional study*

Parts by weight of solids in latex

Latex of styrene-acrylonitrile copolymer (copolymer contains 78% styrene, 22% acrylonitrile by weight: relative viscosity of 1% acetone solution=7.0) __ 65
Latex of butadiene-acrylonitrile copolymer (butadiene-acrylonitrile ratio per Table II) _ 35 or 20 (per Table II)
Latex of butadiene-styrene copolymer (copolymer contains 75% butadiene, 25% styrene by weight) _____ 0 or 15 (per Table II)

A series of latex blends was made up in accordance with the above schedule, using latices of butadiene-acrylonitrile copolymers having different ratios of butadiene and acrylonitrile, and omitting or using the butadiene-styrene copolymer. Each latex blend was coagulated by pouring it into a 1% solution of calcium chloride in water. The coagulum was filtered, washed with water on the filter, re-suspended, re-filtered, re-washed and dried. The dried coagulum was then milled for 20 minutes on a roll mill at about 350° F., and pressed out into plaques in a laboratory press at the same temperature. The plaques were cooled slowly over a period of 10 minutes in order to develop optimum properties. Tabulated herewith are the properties of the plaques made from the several compositions.

TABLE II

| Butadiene-Acrylonitrile Copolymer | | Parts of Butadiene-Styrene Copolymer Used | Physical Properties | | | | | | | Item No. |
|---|---|---|---|---|---|---|---|---|---|---|
| Ratio of Butadiene to Acrylonitrile | Parts Used | | Rockwell Hardness (R Scale) | Modulus of Elasticity (pounds per sq. in.) | Heat Distortion Temperature (° C.) | Izod Impact Strength (ft. lb./in.²) at— | | | | |
| | | | | | | 25° C. | 0° C. | −20° C. | −35° C. | |
| 60/40 | 35 | 0 | 58 | 187,000 | 77 | 18.1 | 14.8 | 0.6 | 0.4 | 1 |
| | 20 | 15 | 62 | 206,500 | 78 | 15.0 | 13.7 | 1.1 | 0.4 | 2 |
| 69/31 | 35 | 0 | 43 | 157,000 | 81 | 15.0 | 17.0 | 1.8 | 0.4 | 3 |
| | 20 | 15 | 53 | 165,000 | 83 | 12.7 | 13.6 | 12.8 | 1.2 | 4 |
| 70/30 | 35 | 0 | 42 | 177,000 | 82 | 11.5 | 14.3 | 9.9 | 0.4 | 5 |
| | 20 | 15 | 47 | 158,000 | 87 | 6.6 | 8.6 | 8.9 | 1.6 | 6 |
| 75/25 | 35 | 0 | 39 | 167,000 | 83 | 9.0 | 11.6 | 11.3 | 0.8 | 7 |
| | 20 | 15 | 51 | 176,500 | 89 | 8.1 | 10.7 | 10.6 | 2.2 | 8 |

From the table it will be evident that the inclusion of the butadiene-styrene copolymer in accordance with this invention (Items 2, 4, 6, 8) substantially enhances the hardness, heat-distortion temperature and low temperature impact strength of the compositions. It will also be noted that the compositions of this invention increase in hardness with increasing acrylonitrile content in the butadiene-acrylonitrile copolymer used, other factors being equal.

*Example III.—Thermal treatment*

Parts by weight of solids in latex
Styrene-acrylonitrile copolymer latex (copolymer contains 78% styrene, 22% acrylonitrile by weight, relative viscosity in 1% acetone solution=7) ___ 65
Butadiene-acrylonitrile copolymer latex (copolymer from charge containing 75 parts butadiene, 25 parts acrylonitrile by weight) _____ 20
Butadiene-styrene copolymer (copolymer from charge containing 70 parts butadiene, 30 parts styrene by weight) _____ 15

The above latices were blended, coagulated, washed, dried and milled as in Example II. The compound was sheeted off with a thickness of 0.07 inch, and portions thereof then subjected to heat treatments as set forth herewith in Table III. Unless otherwise noted, before the heat-treatment, the sheet, as it came from the mill, was cooled on a steel table top with a board superimposed on the sheet to prevent warpage.

TABLE III

| Heat Treatment | Properties of Product | | | Item No. |
|---|---|---|---|---|
| | Heat Distortion Temp. (°C.) | Rockwell Hardness R Scale | Flex Life (cycles) | |
| Sheet still hot from the mill rapidly cooled between cold steel plates | 71 | 13.3 | ½ | 1 |
| Sheet still hot from the mill placed between steel sheets preheated to 175° C., and permitted to cool to 25° C. over a period of 2 hours | 94 | 58.0 | 12 | 2 |
| Sheet placed in laboratory press at 185° C., under weight of platen only (no added pressure) and press cooled in 4 minutes by circulation of water | 84 | 53.0 | 13.0 | 3 |
| Same as preceding, except press cooled slowly over period of ½ hour | 89 | 62.0 | 15.0 | 4 |
| Sheet press-polished under pressure at 185° C., then temperature lowered to 165° C. for 5 minutes, then sheet removed at 165° C. and cooled rapidly between cold steel plates | 81 | 51 | 14.0 | 5 |
| Same as preceding, except that the sheet after removal from the 165° C. press was placed between steel plates having a temperature of 125° C., and the whole cooled to 25° C. over a period of 2 hours | 91 | 62 | 13.8 | 6 |
| Sheet placed in laboratory press at 170° C. under weight of platen only (no added pressure) and press cooled in 4 minutes by circulation of water | 83 | 53 | 14 | 7 |
| Same as preceding except that press was cooled slowly to 25° C. over a period of one-half hour | 93 | 60 | 15 | 8 |
| Sheet press-polished under pressure at 150° C., then press cooled in 4 minutes by circulation of water | 85 | 41 | 3.1 | 9 |
| Same as preceding, except press was cooled slowly to 25° C. over a period of one-half hour | 85 | 50 | 13.0 | 10 |
| Sheet press-polished under pressure at 125° C., then press cooled in 4 minutes by circulation of water | 87 | 28 | 0.5 | 11 |
| Same as preceding, except that press was cooled slowly to 25° C. over a period of one-half hour | 89 | 36 | 0.5 | 12 |
| Sheet was heated to 195° C., then rapidly cooled between cold steel plates | 82 | 52 | 5.3 | 13 |
| Same as preceding, except that the steel plates were preheated to 195° C., and the assembly slowly cooled to 25° C. over a period of 2 hours | 94 | 66 | 13.0 | 14 |

From Table III, it will be evident that the compositions of this invention, when cooled slowly from the forming temperature (items 2, 4, 6, 8, 10, 12, 14) have consistently higher heat distortion temperatures, hardness and flex life than the respective comparable compositions (items 1, 3, 5, 7, 9, 11 and 13) which were rapidly cooled. This effect is in general the more pronounced, the higher the temperature from which the cooling is carried out, compare items 14, 2, and 4 involving higher temperatures with items 10 and 12, involving low temperature.

From the foregoing general discussion and detailed specific examples, it will be evident that this invention provides novel plastic materials having unique and desirable properties adapting them to many and varied uses. The several components of the compositions are cheaply and abundantly available.

What is claimed is:

1. A hard, rigid, homogeneously blended polymeric composition characterized by concurrent high heat distortion temperature, high impact strength and high hardness comprising approximately:

| | Per cent |
|---|---|
| A styrene-acrylonitrile copolymer | 62–80 |
| A butadiene-acrylonitrile copolymer | 8–26 |
| and | |
| An elastomer selected from the group consisting of butadiene homopolymers and butadiene-styrene copolymers | 8–22 | the aforesaid percentages being on the basis of the total weight of said respective copolymers in said composition, said styrene-acrylonitrile copolymer containing from 55% to 80% styrene, balance acrylonitrile, said butadiene-acrylonitrile copolymer containing from 55% to 85% butadiene, balance acrylonitrile and said butadiene-styrene copolymers containing at least 65% butadiene, balance styrene.

2. A hard, rigid, homogeneously blended polymeric composition characterized by concurrent high heat distortion temperature, high impact strength and high hardness comprising approximately:

| | Per cent |
|---|---|
| A styrene-acrylonitrile copolymer | 65 |
| A butadiene-acrylonitrile copolymer | 20 |
| and | |
| A butadiene-styrene copolymer | 15 | the aforesaid percentages being on the basis of the total weight of said respective copolymers in said composition, said styrene-acrylonitrile copolymer containing from 55% to 80% styrene, balance acrylonitrile, said butadiene-acrylonitrile copolymer containing from 55% to 85% butadiene, balance acrylonitrile and said butadiene-styrene copolymer containing from 70% to 80% butadiene, balance styrene.

3. A hard, rigid, homogeneously blended polymeric composition characterized by concurrent high heat distortion temperature, high impact strength and high hardness comprising approximately:

| | Per cent |
|---|---|
| A styrene-acrylonitrile copolymer | 80 |
| A butadiene-acrylonitrile copolymer | 10 |
| and | |
| A butadiene-styrene copolymer | 10 | the aforesaid percentages being on the basis of the total weight of said respective copolymers in said composition, said styrene-acrylonitrile copolymer containing from 55% to 80% styrene, balance acrylonitrile, said butadiene-acrylonitrile copolymer containing from 55% to 85% butadiene, balance acrylonitrile and said butadiene-styrene copolymer containing from 70% to 80% butadiene, balance styrene.

4. A hard, rigid, homogeneously blended polymeric composition characterized by concurrent high heat distortion temperature, high impact strength and high hardness comprising approximately:

| | Per cent |
|---|---|
| A styrene-acrylonitrile copolymer | 75 |
| A butadiene-acrylonitrile copolymer | 15 |
| and | |
| Polybutadiene | 10 | the aforesaid percentages being on the basis of the total weight of said respective copolymers in said composition, said styrene-acrylonitrile copolymer containing from 55% to 80% styrene, balance acrylonitrile, and said butadiene-acrylonitrile copolymer containing from 55% to 85% butadiene, balance acrylonitrile.

5. A hard, rigid, homogeneously blended polymeric composition characterized by concurrent high heat distortion temperature, high impact strength, and high hardness comprising approximately:

| | Per cent |
|---|---|
| A styrene-acrylonitrile copolymer | 70 |
| A butadiene-acrylonitrile copolymer | 17.5 |
| and | |
| A butadiene-styrene copolymer | 12.5 | the aforesaid percentages being on the basis of the total weight of said respective copolymers in said composition, said styrene-acrylonitrile copolymer containing from 55% to 80% styrene, balance acrylonitrile, said butadiene-acrylonitrile copolymer containing from 55% to 85% butadiene, balance acrylonitrile and said butadiene-styrene copolymer containing from 70% to 80% butadiene, balance styrene.

6. A hard, rigid, homogeneously blended polymeric composition characterized by concurrent high heat distortion temperature, high impact strength, and high hardness comprising approximately:

| | Per cent |
|---|---|
| A styrene-acrylonitrile copolymer | 62–80 |
| A butadiene-acrylonitrile copolymer | 8–26 |
| and | |
| A butadiene-styrene copolymer | 8–22 | the aforesaid percentages being on the basis of the total weight of said respective copolymers in said composition, said styrene-acrylonitrile copolymer containing 78% styrene, balance acrylonitrile, said butadiene-acrylonitrile copolymer containing 75% butadiene, balance acrylonitrile and said butadiene-styrene copolymer containing 71% butadiene, balance styrene.

7. A hard, rigid, homogeneously blended polymeric composition characterized by concurrent high heat distortion temperature, high impact strength, and high hardness comprising approximately:

| | Per cent |
|---|---|
| A styrene-acrylonitrile copolymer | 62–80 |
| A butadiene-acrylonitrile copolymer | 8–26 |
| and | |
| A butadiene-styrene copolymer | 8–22 | the aforesaid percentages being on the basis of the total weight of said respective copolymers in said composition, said styrene-acrylonitrile copolymer containing 62% styrene, balance acrylonitrile, said butadiene-acrylonitrile copolymer containing 75% butadiene, balance acrylonitrile and said butadiene-styrene copolymer containing 71% butadiene, balance styrene.

8. A hard, rigid, homogeneously blended polymeric composition characterized by concurrent high heat distortion temperature, high impact strength, and high hardness comprising approximately:

| | Per cent |
|---|---|
| A styrene-acrylonitrile copolymer | 65 |
| A butadiene-acrylonitrile copolymer | 20 |
| and | |
| A butadiene-styrene copolymer | 15 | the aforesaid percentages being on the basis of the total weight of said respective copolymers in said composition, said styrene-acrylonitrile copolymer containing 78% styrene, balance acrylonitrile, said butadiene-acrylonitrile copolymer containing 75% butadiene, balance acrylonitrile and said butadiene-styrene copolymer containing 71% butadiene, balance styrene.

9. A hard, rigid, homogeneously blended polymeric composition characterized by concurrent high heat distortion temperature, high impact strength, and high hardness comprising approximately:

| | Per cent |
|---|---|
| A styrene-acrylonitrile copolymer | 80 |
| A butadiene-acrylonitrile copolymer | 10 |
| and | |
| A butadiene-styrene copolymer | 10 | the aforesaid percentages being on the basis of the total weight of said respective copolymers in said composition, said styrene-acrylonitrile copolymer containing 78% styrene, balance acrylonitrile, said butadiene-acrylonitrile copolymer containing 69% butadiene, balance acrylonitrile and said butadiene-styrene copolymer containing 71% butadiene, balance styrene.

10. A hard, rigid, homogeneously blended polymeric composition characterized by concurrent high heat distortion temperature, high impact strength, and high hardness comprising approximately:

| | Per cent |
|---|---|
| A styrene-acrylonitrile copolymer | 75 |
| A butadiene-acrylonitrile copolymer and | 15 |
| Polybutadiene | 10 | the aforesaid percentages being on the basis of the total weight of said respective copolymers in said composition, said styrene-acrylonitrile copolymer containing 78% styrene, balance acrylonitrile, and said butadiene-acrylonitrile copolymer containing 69% butadiene, balance acrylonitrile.

11. A heat, rigid, homogeneously blended polymeric composition characterized by concurrent high heat distortion temperature, high impact strength, and high hardness, comprising approximately:

| | Per cent |
|---|---|
| A styrene-acrylonitrile copolymer | 70 |
| A butadiene-acrylonitrile copolymer and | 17.5 |
| A butadiene-styrene copolymer | 12.5 | the aforesaid percentages being on the basis of the total weight of said respective copolymers in said composition, said styrene-acrylonitrile copolymer containing 78% styrene, balance acrylonitrile, said butadiene-acrylonitrile copolymer containing 75% butadiene, balance acrylonitrile and said butadiene-styrene copolymer containing 71% butadiene, balance styrene.

12. A hard, rigid, homogeneously blended polymeric composition characterized by concurrent high heat distortion temperature, high impact strength, and high hardness, comprising approximately:

| | Per cent |
|---|---|
| A styrene-acrylonitrile copolymer | 65 |
| A butadiene-acrylonitrile copolymer and | 20 |
| A butadiene-styrene copolymer | 15 | the aforesaid percentages being on the basis of the total weight of said respective copolymers in said composition, said styrene-acrylonitrile copolymer containing 62% styrene, balance acrylonitrile, said butadiene-acrylonitrile copolymer containing 75% butadiene, balance acrylonitrile and said butadiene-styrene copolymer containing 71% butadiene, balance styrene.

13. A hard, rigid polymeric sheet susceptible of hot post-forming and comprising a homogeneous blend of approximately:

| | Per cent |
|---|---|
| A styrene-acrylonitrile copolymer | 62–80 |
| A butadiene-acrylonitrile copolymer and | 8–26 |
| An elastomer selected from the group consisting of butadiene homopolymers and butadiene-styrene copolymers | 8–22 | the aforesaid percentages being on the basis of the total weight of said respective copolymers in said composition, said styrene-acrylonitrile copolymer containing from 55% to 80% styrene, balance acrylonitrile, said butadiene-acrylonitrile copolymer containing from 55% to 85% butadiene, balance acrylonitrile and said butadiene-styrene copolymers containing at least 65% butadiene, balance styrene.

14. A hard, rigid polymeric sheet susceptible of hot post-forming and comprising a homogeneous blend of approximately:

| | Per cent |
|---|---|
| A styrene-acrylonitrile copolymer | 65 |
| A butadiene-acrylonitrile copolymer and | 20 |
| A butadiene-styrene copolymer | 15 | the aforesaid percentages being on the basis of the total weight of said respective copolymers in said composition, said styrene-acrylonitrile copolymer containing from 55% to 80% styrene, balance acrylonitrile, said butadiene-acrylonitrile copolymer containing from 55% to 85% butadiene, balance acrylonitrile and said butadiene-styrene copolymer containing from 70% to 80% butadiene, balance styrene.

15. A hard, rigid polymeric sheet susceptible of hot post-forming and comprising a homogeneous blend of approximately:

| | Per cent |
|---|---|
| A styrene-acrylonitrile copolymer | 75 |
| A butadiene-acrylonitrile copolymer and | 15 |
| Polybutadiene | 10 | the aforesaid percentages being on the basis of the total weight of said respective copolymers in said composition, said styrene-acrylonitrile copolymer containing from 55% to 80% styrene, balance acrylonitrile, and said butadiene-acrylonitrile copolymer containing from 55% to 85% butadiene, balance acrylonitrile.

16. A hard, tough, thermoplastic homogeneous mixture of:

(A) 62–80% of a styrene-acrylonitrile copolymer containing 55–80% of styrene
(B) 9.8–26% of a butadiene-acrylonitrile copolymer containing 60–80% of butadiene
(C) 8–17.5% of rubber polybutadiene, the aforesaid percentages of (A), (B) and (C) being based on the total of their weights in the mixture.

17. A hard, tough, thermoplastic homogeneous mixture of:

(A) 62–80% of a styrene-acrylonitrile copolymer containing 55–80% of styrene
(B) 9.8–26% of a butadiene-acrylonitrile copolymer containing 60–80% of butadiene
(C) 8–17.5% of a butadiene-styrene copolymer containing 65–80% of butadiene, the aforesaid percentages of (A), (B) and (C) being based on the total of their weights in the mixture.

18. A hard, tough, thermoplastic homogeneous mixture of (A) a normally inelastic resinous thermoplastic material selected from the group consisting of copolymers of from 55 to 80% of styrene and correspondingly from 45 to 20% of acrylonitrile, (B) a rubbery copolymer of butadiene-1,3 and acrylonitrile containing 60 to 80% of butadiene, balance acrylonitrile and (C) a rubbery polymeric material selected from the group consisting of homopolymers of butadiene and copolymers of butadiene with styrene containing at least 65% of butadiene, balance styrene, the point representing said mixture on the trilinear diagram of (A), (B) and (C) lying within the polygon whose vertices have the following coordinates:

| | Coordinates | | |
|---|---|---|---|
| | (A) | (B) | (C) |
| First Vertex | 62 | 26 | 12 |
| Second Vertex | 66 | 26 | 8 |
| Third Vertex | 77 | 15 | 8 |
| Fourth Vertex | 62 | 25 | 13 |

References Cited in the file of this patent

UNITED STATES PATENTS

| 2,397,050 | Sarbach | Mar. 19, 1946 |
| 2,439,202 | Daly | Apr. 6, 1948 |
| 2,554,899 | Cowgill | May 29, 1951 |

OTHER REFERENCES

Buskirk: Plastics Industry, 7, 22 and 23 (1949).